(12) United States Patent
Kratzer

(10) Patent No.: US 8,282,072 B2
(45) Date of Patent: Oct. 9, 2012

(54) VALVE CARTRIDGE FOR A SOLENOID VALVE

(75) Inventor: Dietmar Kratzer, Tamm (DE)

(73) Assignee: Robert Bosch GmbH, Stuttgart (DE)

(*) Notice: Subject to any disclaimer, the term of this patent is extended or adjusted under 35 U.S.C. 154(b) by 162 days.

(21) Appl. No.: 12/668,611

(22) PCT Filed: Jul. 1, 2008

(86) PCT No.: PCT/EP2008/058464
§ 371 (c)(1),
(2), (4) Date: Jan. 11, 2010

(87) PCT Pub. No.: WO2009/007277
PCT Pub. Date: Jan. 15, 2009

(65) Prior Publication Data
US 2010/0187459 A1    Jul. 29, 2010

(30) Foreign Application Priority Data
Jul. 9, 2007    (DE) .................. 10 2007 031 855

(51) Int. Cl.
*F16K 31/02* (2006.01)
(52) U.S. Cl. .......... 251/129.15; 251/129.07; 137/315.01
(58) Field of Classification Search ............. 251/129.02, 251/129.07, 129.15; 137/315.03, 15.17, 137/15.18
See application file for complete search history.

(56) References Cited

U.S. PATENT DOCUMENTS

| 4,915,350 | A | * | 4/1990 | Babitzka et al. ......... 251/129.15 |
| 5,085,402 | A | | 2/1992 | O'Dell |
| 5,915,416 | A | | 6/1999 | Okazaki et al. |
| 6,315,268 | B1 | * | 11/2001 | Cornea et al. ............. 251/129.15 |
| 6,679,435 | B1 | * | 1/2004 | Noller et al. ............. 29/890.143 |
| 7,575,218 | B2 | * | 8/2009 | Speer et al. ............. 251/129.02 |
| 7,681,862 | B2 | * | 3/2010 | Kratzer .................... 251/129.02 |
| 7,871,056 | B2 | * | 1/2011 | Kratzer .................... 251/129.02 |
| 2006/0113836 | A1 | | 6/2006 | Nakamura |

FOREIGN PATENT DOCUMENTS

| DE | 19741756 A1 | 1/1999 |
| DE | 102005056939 A1 | 6/2006 |
| WO | 0210627 A1 | 2/2002 |
| WO | 2006056509 A1 | 6/2006 |

OTHER PUBLICATIONS

DE2005044672, Kratzer, Magnet Valve, Sep. 19, 2005.*

* cited by examiner

*Primary Examiner* — Eric Keasel
(74) *Attorney, Agent, or Firm* — Maginot, Moore & Beck

(57) ABSTRACT

The invention relates to a valve cartridge (1') for a solenoid valve having a capsule (4'), having a valve insert (32) which is pushed into the capsule (4') and having a plunger (33) which is guided in a movable fashion in an inner passage (32.1) of the valve insert (32), wherein at least one axially running volume-compensating groove (35) is arranged between the inner passage (32.1) of the valve insert (32) and a plunger casing (33.1). According to the invention, the plunger (33) is designed such that the plunger casing (33.1) has a simple geometric shape and the valve insert (32) is designed such that the at least one axially running volume-compensating groove (35) is formed into the valve insert (12, 22, 32) and is defined by the shape of the inner passage (32.1) of the valve insert (32).

20 Claims, 5 Drawing Sheets

VALVE CARTRIDGE FOR A SOLENOID VALVE

CROSS-REFERENCE TO RELATED APPLICATION

This application is a 35 USC 371 application of PCT/EP2008/058464 filed on Jul. 1, 2008.

BACKGROUND OF THE INVENTION

1. Field of the Invention

The invention is based on a valve cartridge for a solenoid valve.

2. Description of the Prior Art

A valve cartridge for a conventional solenoid valve, in particular for a hydraulic unit which is used for instance in an anti-lock brake system (ABS) or a traction control system (TCS) or an electronic stability program system (ESP system), is shown in FIGS. 1 and 2; FIG. 1 is a schematic longitudinal section and a FIG. 2 is a schematic cross section through the valve cartridge. As can be seen from FIG. 1, the valve cartridge 1 for the conventional solenoid valve has a capsule 4, a valve insert 2, a tappet 3, a restoring spring 8, and an armature 6. In the production of the solenoid valve, the capsule 4 and the valve insert 2 of the valve cartridge 1 are joined together by press-fitting, and the valve cartridge 1 is hydraulically sealed off from the atmosphere by a sealing weld. In addition, the valve insert 2 absorbs the pressure forces that occur in the hydraulic system and conducts them onward via a calked flange to a calked region, not shown, of a fluid block. The valve insert 2 also conducts a magnetic flux, initiated by a magnet unit not shown, onward axially via an air gap in the direction of the armature 6. The valve insert 2 furthermore receives the so-called valve body 7, which includes a main valve seat 7.1 into which a closing element 3.2 of the tappet 3 plunges sealingly, in order to realize the sealing function of the solenoid valve. As can also be seen from FIG. 1, the tappet 3 and the restoring spring 8 are guided in an inner bore 2.1 of the valve insert 2.

As seen from FIG. 2, the inner bore 2.1 of the valve insert 2 as a rule has a completely or very nearly approximated circular shape, in which the tappet 3 is guided. To compensate for the volume that the tappet 3 positively displaces upon its axial motion caused by the magnetic flux initiated by the magnetic unit, and for ventilation and filling, at least one axially extending volumetric-compensation groove 5 is machined into the tappet 3, which complicates the shape of the tappet casing 3.1, as can also be seen from FIG. 3. This complicated shape of the tappet casing 3.1 puts limits on the possible production methods that can be used for the tappet 3. FIGS. 4a and 4b show an alternative embodiment according to the present invention of the valve insert 2', which is produced by curling a sheet-metal strip 2", so that the inner passage 2.1' for guiding the tappet 3 is created only after the curling and is formed by a corresponding surface 2.1" of the sheet-metal strip 2".

ADVANTAGES AND SUMMARY OF THE INVENTION

The valve cartridge for a solenoid valve according to the invention has the advantage over the prior art that the tappet is embodied such that the tappet casing has a simple geometric shape, and the valve insert is embodied such that the at least one axially extending volumetric-compensation groove is machined into the valve insert and specified by the shape of the inner passage of the valve insert, and the tappet is guided movably in the inner passage of the valve insert. Because of the novel shaping according to the invention of the inner passage of the valve insert, the volumetric-compensation grooves on the tappet can be dispensed with, so that as a result of the simple shape of the tappet casing that is possible, advantageously more-favorable production methods can be employed for the tappet while maintaining the same performance of the valve cartridge. For instance, the tappet can be embodied as completely round, and can be made economically from simple pins by simple postmachining. Furthermore, because of the novel shaping of the inner passage, the tappet can be embodied as quite thin and completely round, so that the wall of the valve insert, for the same outer dimensions, can be embodied as correspondingly thicker. This increases the magnetic pole surface area, which advantageously leads to an increase in the available magnetic force.

It is especially advantageous that the valve insert can be produced by curling a sheet-metal strip, and the later shape of the inner passage is made in a corresponding surface of the sheet-metal strip before the curling. This makes it possible for arbitrary favorable shapes for the at least one volumetric-compensation groove to be machined in, before the curling, by simple machining of the corresponding surface of the sheet-metal strip. For instance, the corresponding surface of the sheet-metal strip can be machined such that the inner passage of the valve insert, after the curling of the sheet-metal strip that forms the valve insert, has an internal toothing with a predeterminable number of teeth and/or with a predeterminable tooth shape. Alternatively, the corresponding surface of the sheet-metal strip can be machined such that the inner passage of the valve insert, after the curling of the sheet-metal strip forming the valve insert, has a predeterminable number of sides and is embodied for instance as a polygonal and/or orbiform curve socket, with an arbitrary number of between 3 and n sides.

Alternatively, the valve insert can be embodied as a cold-formed part, and the at least one volumetric-compensation groove is made in the valve insert by reaming or during the cold-forming process.

Advantageous embodiments, described below, of the invention as well as the conventional exemplary embodiments explained above for better comprehension of the invention, are shown in the drawings. In the drawings, identical reference numerals designate components and elements that perform the same or analogous functions.

DESCRIPTION OF THE PREFERRED EMBODIMENTS

Figure 1:
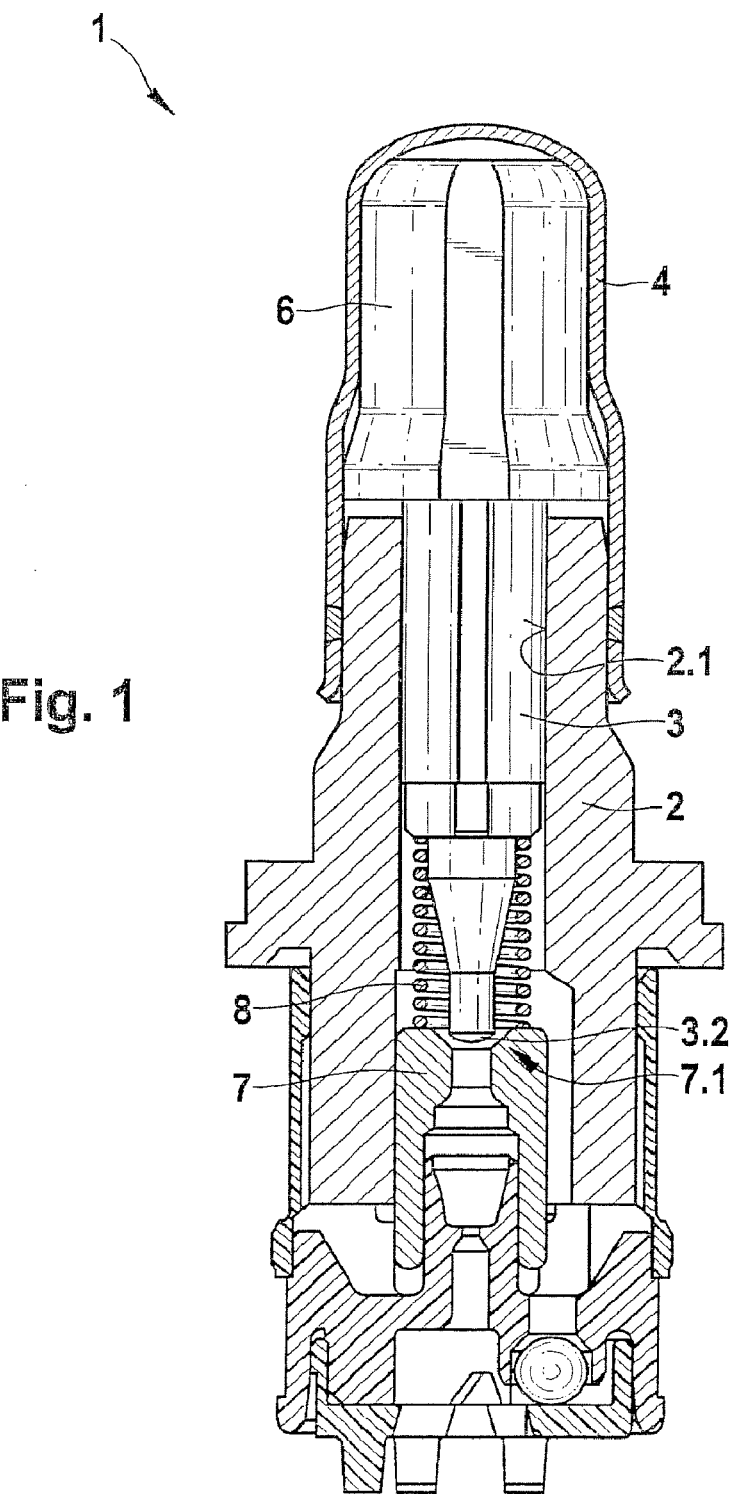
FIG. 1 shows a schematic sectional view of a valve cartridge of a conventional solenoid valve.
Figure 2:
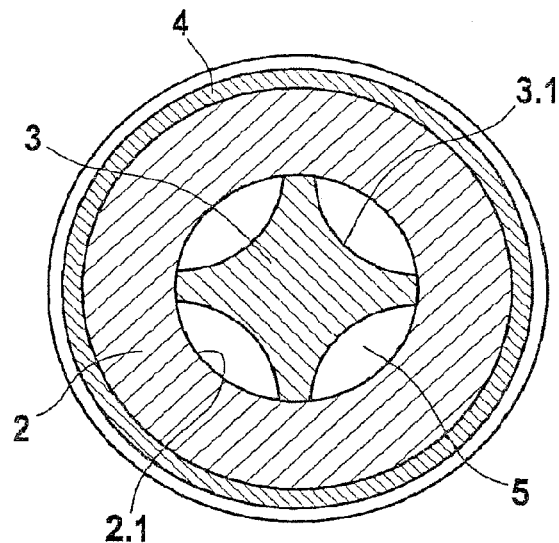
FIG. 2 shows a schematic cross-sectional view of the valve cartridge of FIG. 1.
Figure 3:
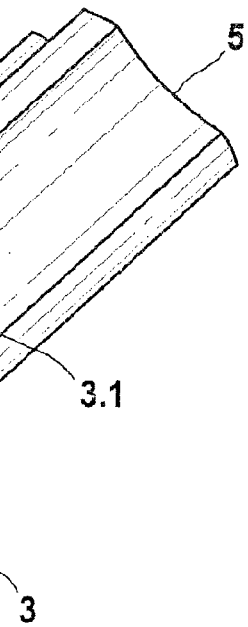
FIG. 3 shows a perspective view of a tappet for the valve cartridge of FIGS. 1 and 2.
Figure 4A:
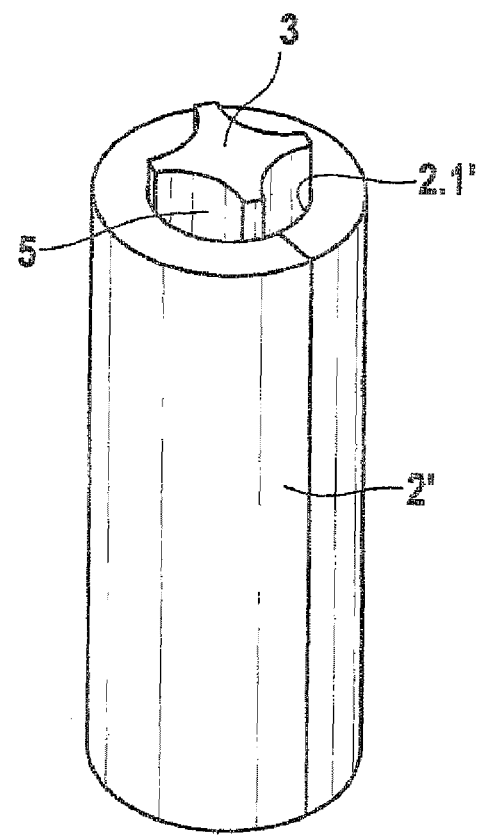
FIGS. 4a and 4b show a schematic view of an alternative embodiment of a valve insert for a conventional valve cartridge.
Figure 4B:
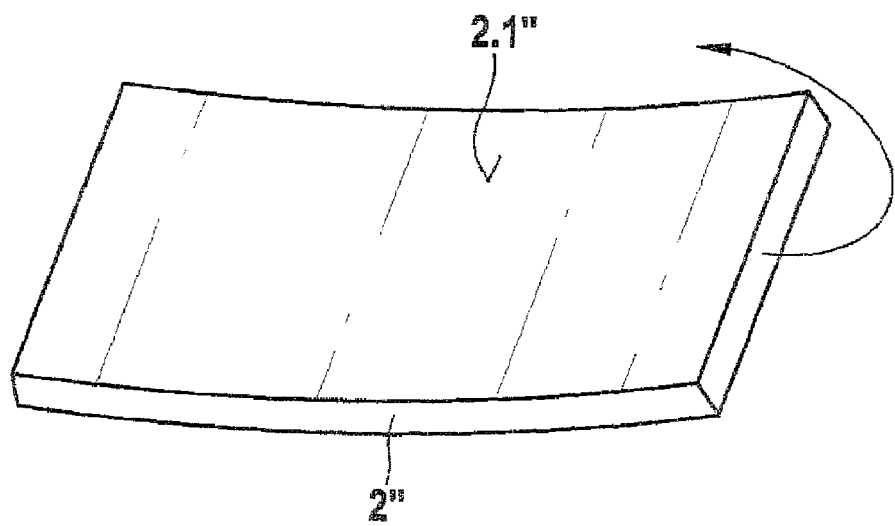
Figure 5:
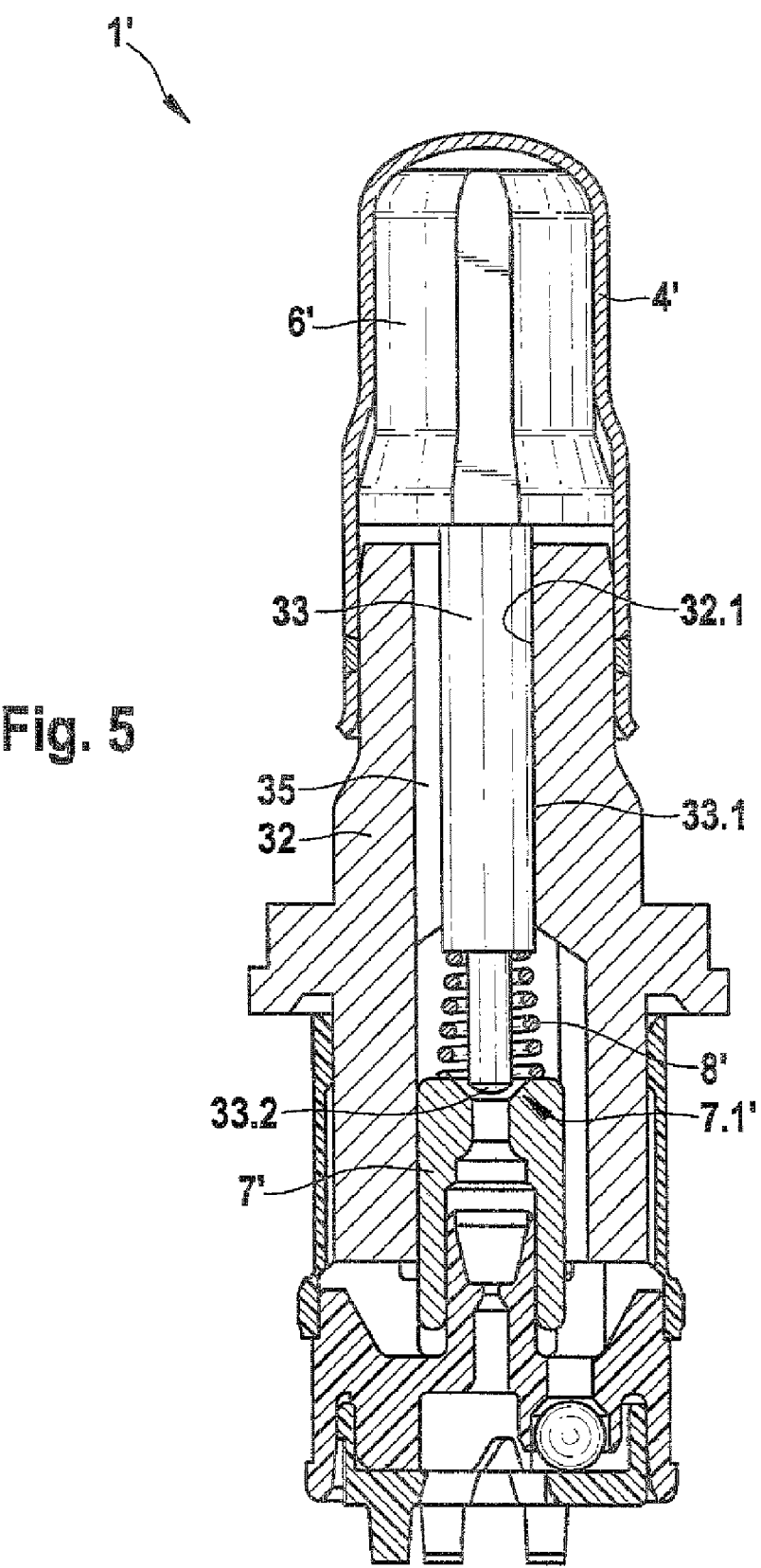
FIG. 5 shows a schematic sectional view of a valve cartridge of the invention for a solenoid valve.

As can be seen from FIG. 5, a valve cartridge 1' according to the invention for a solenoid valve, analogously to the valve cartridge 1 of FIG. 1, has a capsule 4', a valve insert 32 inserted into the capsule 4' and embodied for instance as a cold-formed part, a tappet 33 guided movably in an inner passage 32.1 of the valve insert 32, a restoring spring 8', and an armature 6'. In the production of the solenoid valve, the capsule 4' and the valve insert 32 of the valve cartridge 1' are joined together by press-fitting, and the valve cartridge 1' is hydraulically sealed off from the atmosphere by a sealing weld. In addition, the valve insert 32 absorbs the pressure forces that occur in the hydraulic system and conducts them onward via a calked flange to a calked region, not shown, of a fluid block. The valve insert 32 also conducts a magnetic flux, initiated by a magnet unit not shown, onward axially via an air gap in the direction of the armature 6'. The valve insert 32 furthermore receives the so-called valve body 7', which includes a main valve seat 7.1' into which a closing element 33.2 of the tappet 33 plunges sealingly, in order to realize the sealing function of the solenoid valve. Supplying current to the magnet unit, not shown, generates a magnetic force in the valve cartridge 1' that moves the armature 6' with the tappet 33 axially in the direction of the valve insert 32, counter to the force of the restoring spring 8', as a result of which the sealing element 33.2 of the tappet 33 plunges sealingly into the main valve seat 7.1'.

As also seen in FIG. 5, the casing 33.1 of the tappet 33 has a simple, essentially round shape, and an axially extending volumetric-compensation groove 35 is machined into the valve insert 32 and is predetermined by the shape of the inner passage 32.1 of the valve insert 32. The at least one volumetric-compensation groove 35 can be made in the valve insert 32 for instance by reaming or during the cold-forming process. With the elimination of the volumetric-compensation grooves on the tappet 33, the tappet casing can be embodied with a completely round cross section, so that the tappet 33 can be produced economically from simple pins by simple postmachining.

As seen from FIGS. 6a and 6b, a valve insert 12 can alternatively be produced by curling a sheet-metal strip 12' in the direction of the arrow; the later shape of an inner passage 12.1 of the valve insert 12 is made, before the curling, in a corresponding surface 12.1' of the sheet-metal strip 12'. Analogously to the embodiment of FIG. 5, the casing 13.1 of the tappet 13, guided in the inner passage 12.1 of the valve insert 12, has a simple, essentially round shape. A plurality of axially extending volumetric-compensation grooves 15 are machined into the valve insert 12 and are predetermined by the shape of the inner passage 12.1 of the valve insert 12.

Figure 6A:
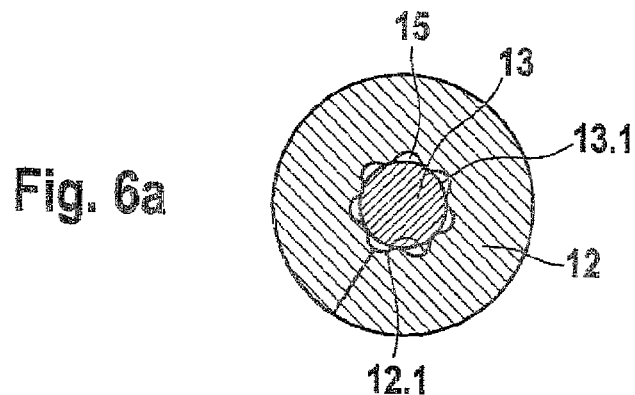
FIGS. 6a and 6b show a first embodiment of a valve insert and a tappet for a valve cartridge of the invention.
Figure 6B:
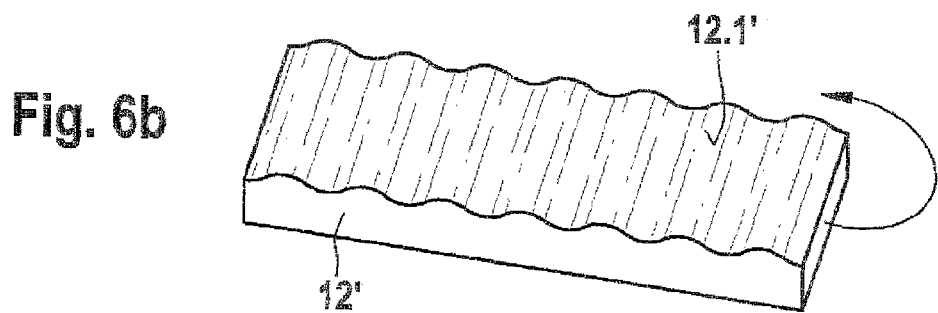

As also seen in FIGS. 6a and 6b, the plurality of volumetric-compensation grooves 15 can be generated by machining an internal toothing into the inner passage 12.1 of the valve insert 12. The internal toothing may have an arbitrarily predeterminable number of teeth and/or an arbitrarily predeterminable tooth shape. Before the curling, the internal toothing is machined into a corresponding surface 12.1' of the sheet-metal strip 12' in such a way that the inner passage 12.1 is created with the desired internal toothing after the curling of the sheet-metal strip 12'.

Analogously to FIGS. 6a and 6b, FIGS. 7a and 7b show a further embodiment of a valve insert 22, which can be made by curling a sheet-metal strip 22'; the later shape of an inner passage 22.1 of the valve insert 22 is made, before the curling, in a corresponding surface 22.1' of the sheet-metal strip 22'.

A tappet 23 guided in the inner passage 22.1 of the valve insert 22 likewise has the simple, essentially round shape, and a plurality of axially extending volumetric-compensation grooves 25 are machined into the valve insert 22 and are predetermined by the shape of the inner passage 22.1 of the valve insert 22.

Figure 7A:
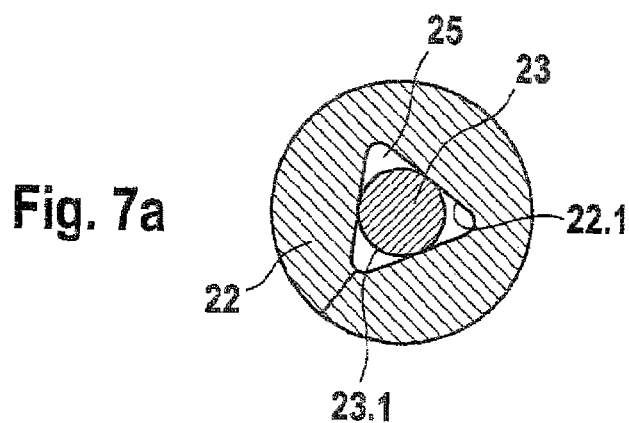
FIGS. 7a and 7b show a second embodiment of a valve insert and a tappet for a valve cartridge of the invention.
Figure 7B:
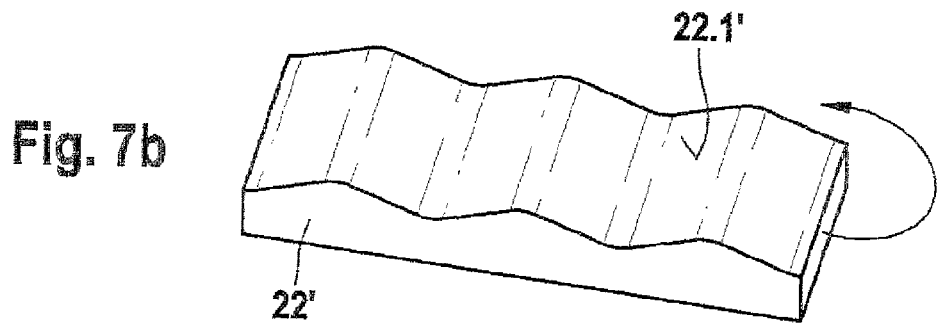

As can be seen from FIGS. 7a and 7b, the plurality of volumetric-compensation grooves 25 can be generated by machining a plurality of sides into the inner passage 22.1 of the valve insert 22. Before the curling, the sides are machined into a corresponding surface 22.1' of the sheet-metal strip 22', so that the inner passage 22.1, after the curling of the sheet-metal strip 12', has the desired shape of a polygonal or orbiform curve socket. In the exemplary embodiment shown, the inner passage has the shape of a triangle socket and includes three volumetric-compensation grooves 25.

By the novel shaping according to the invention of the inner bore of the valve insert, the volumetric-compensation grooves on the tappet can be dispensed with, so that as a result of the simple shape of the tappet casing that is possible, advantageously more-favorable production methods can be employed for the tappet while maintaining the same performance of the valve cartridge.

The foregoing relates to the preferred exemplary embodiments of the invention, it being understood that other variants and embodiments thereof are possible within the spirit and scope of the invention, the latter being defined by the appended claims.

The invention claimed is:

1. A valve cartridge for a solenoid valve, comprising:
   a capsule;
   a valve insert inserted into the capsule;
   said valve insert comprising a curled sheet-metal strip having abutting ends defining a cylinder with an inner passage;
   a tappet defining a tappet casing guided movably in said inner passage of the valve insert, in which
   at least one axially extending volumetric-compensation groove is disposed between the inner passage of the valve insert and said tappet casing,
   the tappet being embodied such that the tappet casing has a simple geometric shape, and
   the valve insert further comprising said at least one axially extending volumetric-compensation groove extending along a corresponding surface of said sheet-metal strip defining said inner passage.

2. The valve cartridge as defined by claim 1, wherein the valve insert is produced by curling said sheet-metal strip to form said cylinder, and the compensation groove is machined in a corresponding surface of the sheet-metal strip before the curling.

3. The valve cartridge as defined by claim 2, wherein said at least one volumetric-compensation groove comprises an internal toothing with a predeterminable number of teeth and/or with a predeterminable tooth shape.

4. The valve cartridge as defined by claim 2, wherein the at least one volumetric-compensation groove comprises a predeterminable number of sides.

5. The valve cartridge as defined by claim 2, wherein the valve insert is embodied as a cold-formed part, and the at least one volumetric-compensation groove is made in the valve insert by reaming or during the cold-forming process.

6. The valve cartridge as defined by claim 5, wherein said at least one volumetric-compensation groove comprises internal toothing with a predeterminable number of teeth and/or with a predeterminable tooth shape.

7. The valve cartridge as defined by claim 5, wherein the tappet casing has an essentially round shape.

8. The valve cartridge as defined by claim 7, wherein the at least one volumetric-compensation groove comprises a predeterminable number of sides.

9. The valve cartridge as defined by claim 7, wherein said at least one volumetric-compensation groove comprises internal toothing with a predeterminable number of teeth and/or with a predeterminable tooth shape.

10. The valve cartridge as defined by claim 9, wherein the at least one volumetric-compensation groove comprises a predeterminable number of sides.

11. The valve cartridge as defined by claim 5, wherein the at least one volumetric-compensation groove comprises a predeterminable number of sides.

12. The valve cartridge as defined by claim 2, wherein the tappet casing has an essentially round shape.

13. The valve cartridge as defined by claim 12, wherein said at least one volumetric-compensation groove comprises internal toothing with a predeterminable number of teeth and/or with a predeterminable tooth shape.

14. The valve cartridge as defined by claim 12, wherein the at least one volumetric-compensation groove comprises a predeterminable number of sides.

15. The valve cartridge as defined by claim 1, wherein the tappet casing has an essentially round shape.

16. The valve cartridge as defined by claim 15, wherein said at least one volumetric-compensation groove comprises internal toothing with a predeterminable number of teeth and/or with a predeterminable tooth shape.

17. The valve cartridge as defined by claim 15, wherein the at least one volumetric-compensation groove comprises a predeterminable number of sides.

18. The valve cartridge as defined by claim 1, wherein said at least one volumetric-compensation groove comprises internal toothing with a predeterminable number of teeth and/or with a predeterminable tooth shape.

19. The valve cartridge as defined by claim 18, wherein the at least one volumetric-compensation groove comprises a predeterminable number of sides.

20. The valve cartridge as defined by claim 1, wherein the at least one volumetric-compensation groove comprises a predeterminable number of sides.

* * * * *